United States Patent Office 3,230,205
Patented Jan. 18, 1966

3,230,205
COPOLYMERS OF 2-PHENYL ALLYL AND
ACRYLO MATERIALS
Willis C. Keith, Lansing, Ill., assignor to Sinclair Research, Inc., Wilmington, Del., a corporation of Delaware
No Drawing. Filed Dec. 1, 1961, Ser. No. 156,497
14 Claims. (Cl. 260—85.5)

This invention concerns novel copolymers of 2-phenyl-allyl alcohol, its esters and ethers, with acrylo materials; viz, acrylonitrile and acrylate esters. These polymers are solids at ambient temperatures and have properties which make them useful for a number of applications. They make excellent protective coatings, are resistant to most organic solvents and to scratching and adhere tenaciously to polar surfaces such as glass. They are transparent, and thus can be used to coat decorative items.

One of these polymers, that formed from 2-phenyl-allyl alcohol and acrylonitrile has the remarkable property of changing its characteristics when heated for a short time at relatively low temperatures. Ordinarily this polymer can be produced at about 50–60° C. to produce a solid polymer which is soluble in solvents such as acetone, but when products, for example, films, prepared at low temperatures are cured in the absence of an initiator or catalyst, the polymer becomes insoluble in all common organic solvents. Thus, the alcohol-nitrile polymer is characterized by different properties in the uncured and cured state. Infrared data indicate that this change is at least to some extent a chemical change. In either state this polymer as well as the others, has excellent optical properties, being transparent and highly glossy.

In the uncured state, the alcohol-nitrile polymer is effective as a bonding or sealing agent. The novel copolymers of this invention are characterized by an intrinsic viscosity of about 0.1 to 2, preferably about 0.15 to 1.6 in dimethyl formamide at 37.8° C. and all but the cured alcohol-nitrile polymer are thermoplastic. Intrinsic viscosity is calculated by extrapolating to zero the measured specific viscosity of several solutions of the polymer in the solvent at less than 2% polymer concentration.

It is of interest, as well as a novel part of this invention, to note that the crude polymers can be used for the preparation of coatings without the usual purification procedures that are commonly used to remove low molecular weight polymers as well as reaction initiators that may be detrimental to film properties.

Acrylate polymers included in this invention are improved over conventional acrylate polymers; for example, methyl methacrylate polymers ordinarily possess excellent optical properties but are soft and are not scratch resistant, making them unsatisfactory for many applications. A major difficulty encountered in preparing acrylate polymers is avoiding "run away" polymerization resulting in poor physical properties of the polymers. When acrylates are copolymerized with 2-phenyl-allyl alcohol, the polymers are very hard and for the most part are scratch resistant, the extent of this property being somewhat dependent on polymer composition as well as conditions that are used for the polymerization reaction and presumably crosslinking that may take place during the curing operation. In addition to the improved properties of the polymers, the 2-phenyl-allyl alcohol serves as a moderator for the polymerization reaction, preventing the "run away" that results in poor physical properties of the polymers.

The composition of the copolymers can be varied over a wide range, the end usage dictating the optimum composition. For most uses the combining weight ratio is 0.001 to 20 parts allyl material to one part acrylo material. For the copolymers of acrylonitrile and 2-phenyl-allyl ester or ether, the preferred proportions are 0.05 to 3 parts allyl ester or ether to 1 part acrylonitrile. For the copolymer of 2-phenyl-allyl alcohol with acrylates the preferred proportions are 0.001 to 3 parts allyl alcohol to 1 part acrylate. For the copolymer of 2-phenyl-allyl alcohol and acrylonitrile the preferred proportions are about 0.1 to 9 parts allyl alcohol to one part acrylo, with the ratio for coatings and films with the most desirable spectrum of qualities being about 0.75 to 4 parts 2-phenyl-allyl alcohol to one part by weight of acrylonitrile. In this range, the polymer has the best hardness, transparency and clarity. Fractionation of the non-heat treated polymer product shows a substantially uniform heteropolymer is formed at any proportions within the ranges recited above, rather than a mixture of homopolymers.

The 2-phenyl allyl starting material for the copolymers of this invention is of the type

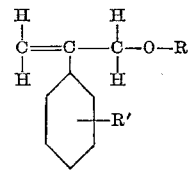

where R is hydrogen, hydrocarbon (alkyl, aryl, etc.) or acyl (including aromatic acyl), generally of 1–8 carbon atoms and R' is hydrogen, halogen, or a hydrocarbon radical of 1–10 carbon atoms, for example alkyl or fused-ring hydrocarbon radicals such as naphthyl. The acrylo component has the configuration

where R' is as defined above and Y is cyano or COOR² where R² is alkyl of 1–6 carbon atoms. Any of the R groups may be substituted with substituents that do not deleteriously affect the reaction. Preferably R, when a hydrocarbon, is methyl or ethyl and R² is methyl.

2-phenyl-allyl alcohol may be made by suitable methods, for example, as disclosed in U.S. Patent 2,537,622, and esters may be prepared from this by known reactions with suitable acids. The ether may be prepared by refluxing the allyl chloride with an alkali alcoholate of the ROH alcohol.

It is preferred that the polymerization reaction be carried out by dissolving the allyl and acrylo materials in the proper proportions in a so-called "ideal solvent"; that is, one in which all of the reactants and the polymer product are soluble. Such an ideal solvent is dimethyl formamide. Non-ideal hydrocarbon solvents such as cyclohexane and benzene, which dissolve the monomers but precipitate the polymers, may also be used, and, actually, bulk polymerization, in which the reactants are contacted in the liquid state without a solvent, is satisfactory under certain conditions; for example, it is generally advisable to prevent curing of the allyl alcohol-nitrile polymer until it has been given its final form and to prevent long exposure to relatively high temperatures which could cause other polymers, such as those containing acetate, to cross-link to an infusable material or a material insoluble in ordinary solvents. Emulsion polymerization is also sometimes feasible. The monomers are usually charged to the reactor at the same time, however the addition of the allyl material to molding syrups (partially polymerized acrylates) that are frequently used gives satisfactory results, and in some cases this is the preferred procedure.

The polymerization reaction is carried out by the use of free radical initiators such as peroxides, azo compounds, etc. The quantity of initiator employed is not of prime importance; however, the reactions run well employing from about 0.5 to 5 weight percent peroxide as benzoyl peroxide. The use of gamma rays, for example, from cobalt-60, to promote the polymerization reaction has been successful and is considered to be a source for the production of free radicals. Redox catalyst systems are also included within the scope of this invention.

The polymerization may be carried out at a temperature within the range of about 0 to 100° C., but for high molecular weight polymers it is best to restrict the reaction temperature to below about 60 or 65° C. to minimize chain transfer reactions. When the phase-changeable copolymer of 2-phenyl allyl alcohol and acrylonitrile is made, temperatures above about 65° C. may be used and such a procedure may accomplish both first stage (polymerization) and second stage (curing) treatments if the reaction initiator or catalyst is removed, destroyed or deactivated after sufficient polymerization has occurred. The most desirable lower polymerization temperature is about 25° C. The reaction is usually run at about 56° C. for a period of several hours. There are no special pressure requirements, but the liquid phase should be maintained and the pressure kept constant during the reaction. At least about 75%, preferably about 80–85 percent, of the monomers is ordinarily converted to polymer when the reaction is run to give what appears to be the most desirable copolymer. However, the reaction can be carried essentially to completion by allowing the reaction to continue for several hours (288) at 25° C. or for a much shorter time at 100° C. (4 hours).

With the allyl alcohol-acrylonitrile polymerization solvent removed, this solid copolymer may be shaped to the desired form. Alternatively, films of any of the copolymers of this invention may be prepared from a dilute, say about 10%, solution of the polymer in an ideal solvent such as dimethyl formamide by casting and removing the solvent at about 100° C. and 375 mm. Hg absolute pressure.

The curing, reforming, or further chemical conversion of the 2-phenyl-allyl alcohol-acrylonitrile copolymer takes place at a temperature of about 65 to 130° C. in the substantial absence of the polymerization initiator. Also, usually, this treatment is conducted in the substantial absence of solvent. Curing takes place at a temperature greater than about 65° C. but not so high as to destroy the polymer, the time depending upon the temperature chosen. In any event, the heat treatment is prolonged for the time necessary to produce substantial insolubility toward acetone and dimethyl formamide, which are representative organic solvents. The polymer films, or articles coated with the polymer, may, for instance, be treated for several hours at about 65 to 75° C. to give the desired effect or for one hour or less at about 100° C. or for a few minutes up to about an hour at about 130° C. This second stage product is highly desirable for many applications, but is not necessary in many instances.

EXAMPLES

The following examples are illustrative of this invention but are not to be considered limiting. Each of Examples 1–71 was run employing substantially the same procedure. The liquid reagents or solutions of reagents in benzene (1), n-hexane (2), cyclohexane (3), or dimethyl formamide (4) were charged to polymerization tubes which were evacuated and flushed with pure nitrogen for several minutes to eliminate oxygen from the reaction. A positive pressure of nitrogen was maintained on the tubes by means of a balloon. The tubes were allowed to warm to room temperature and then placed in a constant temperature bath for the time and temperature indicated in Tables I, IV, V and VI below. The polymers were worked up by conventional procedures, namely, the polymers were dissolved in ketones or dimethyl formamide and precipitated by the addition of methanol. Where an analysis is given, the polymers were analyzed by infrared, nitrogen or carbon-hydrogen analysis.

Table I reports on copolymers of 2-phenyl-allyl alcohol and acrylonitrile. All the polymers were soluble in DMF and acetone except the 2.6 grams fraction of Example 4 and the product of Example 7. The solution-precipitation procedure was repeated several times and finally the polymers were dried in a vacuum oven at below 65° C.

*Table I*

| Example Number | Monomers | | Catalyst, benzoyl peroxide (g.) | Solvent (ml.) | Conditions | | Polymer | | |
|---|---|---|---|---|---|---|---|---|---|
| | Alcohol (g.) | Nitrile (g.) | | | Temp., °C. | Time, hrs. | Yield (g.) | Wt. percent Nitrile | Wt. percent Alcohol |
| 1 | 2.0 | 2.4 | 0.04 | None | 56 | 16 | 2.0 | 32 | 68 |
| 2 | 2.0 | 2.4 | 0.05 | (1) 10.0 | 56 | 70 | 2.5 | | |
| 3 | 0.5 | 3.6 | 0.125 | (1) 10.0 | 56 | 24 | 3.8 | 83 | 17 |
| 4 | 1.0 | 3.2 | 0.125 | (1) 10.0 | 56 | 24 | 2.6 / 0.5 | 74 / 40 | 26 / 60 |
| 5 | 2.0 | 0.40 | 0.125 | None | 56 | 72 | 0.8 | 13 | 87 |
| 6 | 2.0 | 2.40 | 0.10 | (1) 10.0 | 56 | 24 | 0.8 | 29 | 71 |
| 7 | 0.25 | 3.8 | 0.10 | (1) 10.0 | 56 | 18 | 3.5 | 87 | 13 |
| 8 | 2.0 | 2.4 | 0.04 | None | 56 | 24 | 2.3 | 28 | 72 |
| 9 | 2.0 | 2.4 | 0.10 | (1) 5.0 | 56 | 24 | 2.16 | | |
| 10 | 2.0 | 2.4 | 0.10 | (2) 5.0 | 56 | 24 | 3.46 | | |
| 11 | 2.0 | 2.4 | 0.10 | (3) 5.0 | 56 | 24 | 3.67 | | |
| 12 | 2.0 | 2.4 | 0.10 | None | 56 | 24 | 2.76 | | |
| 13 | 2.0 | 2.4 | 0.10 | (3) 5.0 | 56 | 24 | 3.54 | | |
| 14 | 2.0 | 2.4 | 0.10 | (3) 5.0 | 56 / 100 | 24 / 4 | 4.31 | 54 | 46 |
| 15 | 4.0 | 0.8 | 0.25 | None | 56 | 72 | 2.30 | 13 | 87 |
| 16 | 4.0 | 4.8 | 0.20 | (3) 10.0 | 56 / 25 | 24 / 288 | 8.56 | 54 | 46 |
| 17 | 4.0 | 4.8 | 0.20 | (3) 10.0 | 56 | 24 | 7.04 | | |
| 18 | 4.0 | 4.8 | 0.20 | (3( 10.0 | 56 | 24 | 7.10 | | |
| 19 | 4.0 | 4.8 | 0.20 | (3) 10.0 | 56 | 24 | 7.10 | 32 | 68 |

Samples 3, 4 and 13 to 16 were examined for their viscosity at 37.8° C. employing dimethyl formamide as the solvent and an Ostwald-type viscometer tube. Table II below records the concentration of typical solutions and the flow time, in seconds, of these solutions, as well as the viscosity index for the solutions as calculated by the formulae $$N_i = \frac{N_{sp}}{c}$$

$$N_{sp} = \frac{T_2}{231.9} - 1$$

wherein $N_i$ is the viscosity index, $N_{sp}$ is the specific viscosity, $c$ is the concentration, i.e., grams of polymer/ 100 ml. of solution, $T_2$ is the flow time of the polymer solution in seconds and 231.9 is the flow time of the solvent alone. The viscosity index is generally numerically equivalent to the intrinsic viscosity.

Table II

| Sample | $c$ | $T_2$ | $N_i$ |
|---|---|---|---|
| 3 | 1.0 | 594.5 | 1.56 |
| 4 | 0.5 | 391.5 | 1.38 |
| 13 | 1.0 | 308.6 | 0.33 |
| 14 | 0.74 | 297.5 | 0.38 |
| 15 | 1.0 | 300.0 | 0.29 |
| 16 | 1.0 | 523.1 | 1.26 |

These examples illustrate a number of significant variables that have an effect on the alcohol-nitrile reaction as well as the polymer that it produced. Examples number 1, 3 and 15 illustrate that the composition of the polymer can be varied over a wide range by employing various ratios of 2-phenyl-allyl alcohol to acrylonitrile. A comparison of these examples also illustrates that the quantity of initiator can be varied over a wide range and does not appear to be critical. The following examples taken from Table I illustrate the effect of solvent on the reaction as indicated by the yield of polymer.

| Example | Solvent | Percent conversion to polymer |
|---|---|---|
| 12 | None | 63 |
| 9 | Benzene | 49 |
| 10 | Cyclohexane | 79 |
| 11-13 | Dimethyl formamide | 81-83 |

In the above examples the reaction time, temperature, quantity of initiator and volume, if any, of solvent were the same. All of the polymers produced excellent films, but the conversion to polymer in both cyclohexane and dimethyl formamide was much higher than in benzene or the absence of a solvent. The polymer before curing is quite soluble in dimethyl formamide and this is the preferred solvent. The polymer is insoluble in both benzene and cyclohexane, but benzene appears to retard the reaction.

EXAMPLES 20–22

The following examples are used to illustrate the effect of polymer composition on film properties. The films were prepared from a 10 percent solution of allyl alcohol-acrylonitrile copolymer in dimethyl formamide. The solvent was evaporated at 100° C. and 375 mm. Hg absolute, destroying any free radical materials and forming thin films.

| Example Number | Composition | | Properties |
|---|---|---|---|
| | Wt. Percent Alcohol | Wt. Percent Nitrile | |
| 20 | 87 | 13 | Film was clear-transparent, hard, and adhered well to glass. |
| 21 | 71 | 29 | Film was transparent, very hard (scratch resistant), and adhered tenaciously to glass. |
| 22 | 17 | 83 | Film was hard, high gloss, but yellowish in color and did not adhere well to glass. |

The film described in Example 20 possesses excellent properties but is definitely inferior to the film described in Example 21, and the film used for Example 22 was very poor compared to the other films. The optical and bonding properties of the polymers are definitely poor when these polymers contain over about 80% nitrile.

EXAMPLES 23 AND 24

A polymer was prepared identical to the one illustrated in Example 19, and the uncured, crude polymer was diluted to 10 percent by the addition of dimethyl formamide. The polymer solution was divided into two equal parts. One part was used for the preparation of films without out any purification, and the other part was treated with methanol to precipitate the polymer. The precipitated polymer was dissolved in acetone and reprecipitated by the addition of methanol. This procedure was repeated three times and the polymers were dissolved in dimethyl formamide for the preparation of films. Films from both the crude and purified polymer were prepared by removing the solvent at 100° C. and 375 mm. of Hg absolute.

| Example Number | Polymer | Properties |
|---|---|---|
| 23 | Purified | Film was very hard (scratch resistant), transparent and adhered tenaciously to glass. |
| 24 | Crude | Film appeared identical to the film prepared from the polymer that was purified by precipitation (Example 23). |

EXAMPLES 28–38

A series of tests were run to illustrate resistance of the film to various solvents brought about by curing. For this purpose two polymers containing 46 and 68 percent alcohol were used. The films were treated at a reduced pressure of 375 mm. of Hg absolute in the absence of solvent and free radical materials for the time and temperature indicated in the following table and then immersed in the solvent.

Table III

| Example Number | Polymer wt. percent alcohol | Film treated | | Solvent at 25° C. | Time (hrs.) | Loss (wt. percent) |
|---|---|---|---|---|---|---|
| | | Time (hrs.) | Temp., ° C. | | | |
| 28 | 46 | 16 | 100 | Water | 72 | 0.0 |
| 29 | 68 | 1 | 100 | do | 72 | 0.0 |
| 30 | 46 | 16 | 100 | Benzene | 24 | 0.0 |
| 31 | 68 | 1 | 100 | do | 24 | 0.0 |
| 32 | 68 | 16 | 100 | do | 50 | 0.0 |
| 33 | 68 | 16 | 100 | $CCl_4$ | 50 | 0.0 |
| 34 | 68 | 16 | 100 | Normal hexane | 100 | 0.0 |
| 35 | 68 | 16 | 100 | 30% $H_2SO_4$ | 100 | 0.0 |
| 36 | 68 | 16 | 100 | 10% NaOH | 100 | 0.0 |
| 37 | 68 | 1 | 100 | Acetone | 72 | +3.9 |
| 38 | 68 | 4 | 130 | Methanol | 50 | +7.0 |

In none of the above examples was a loss in weight observed and the films retained their excellent properties. An increase in weight was observed with both acetone and methanol as indicated in Examples 37 and 38 but no other change in the film was observed. Thus the excellent resistance of the alcohol-nitrile copolymers of this invention to various solvents is apparent.

EXAMPLES 49–58

The ethyl ether of 2-phenyl-allyl alcohol was prepared by refluxing 2-phenyl-allyl chloride in 90% ethanolic alkali for 24 hours. A near quantitative yield was obtained from the hydrolysis reaction. The high purity 2-phenyl-allyl-ethyl ether boiled at 96° C. at 10 mm. and a refractive index of $n_D^{25} = 1.5202$ was obtained.

Table IV

| Example Number | Reagents charged | | | | Conditions | | Polymer solubility | | | | | Yield (g.) |
|---|---|---|---|---|---|---|---|---|---|---|---|---|
| | Acrylate (g.) | Nitrile (g.) | Benzoyl peroxide (g.) | Solvent (ml.) | Temp., °C. | Time (hrs.) | Percent nitrile | Ni | DMK | Benzene | DMF | |
| 39 | 2.0 | 2.4 | 0.10 | (1) 10 | 56 | 50 | 26.2 | | S | S | S | 0.8 |
| | | | | | | | 28.1 | | I | I | S | 1.3 |
| 40 | 1.0 | 3.2 | 0.10 | (1) 10 | 56 | 24 | 54 | 0.84 | I | I | S | 1.6 |
| 41 | 0.5 | 3.6 | 0.10 | (1) 10 | 56 | 24 | 78 | 1.66 | I | I | S | 2.2 |
| 42 | 3.0 | 1.8 | 0.10 | (1) 10 | 56 | 48 | 22 | 0.16 | S | I | S | 1.1 |
| 43 | 2.0 | 0.4 | 0.10 | None | 56 | 48 | 14 | 0.13 | S | I | S | 0.9 |
| 44 | 2.0 | 2.4 | 0.10 | (1) 10 | 56 | 24 | 27 | | S | S | S | 0.75 |
| 45 | 0.25 | 3.8 | 0.10 | (1) 10 | 56 | 18 | 85 | | I | I | S | 2.7 |
| 46 | 2.0 | 2.4 | 0.10 | (3) | 56 | 24 | 28 | | | | S | 1.4 |
| 47 | 2.0 | 2.4 | 0.10 | (4) 5 | 56 | 24 | | | | | S | 2.8 |
| 48 | 2.0 | 2.4 | 0.10 | (4) 10 | 56 | 24 | | | | | S | 3.4 |

EXAMPLES 39–48

Table IV shows the conditions and results for producing copolymers of 2-phenyl-allyl acetate and acrylonitrile. Solubility of the polymer, solid at ambient temperature, is given for various solvents; DMK stands for dimethyl ketone.

When films were prepared from solutions of these copolymers in dimethylformamide at 100° C. and 375 mm. film which was almost transparent except for a slight haze. The Example 41 film also was very hard and Hg, Example 40 produced a very hard scratch resistant scratch resistant but was inferior to Example 40. The Example 46 film also was very hard and scratch resistant. It also was transparent and superior to Example 40. Example 47 produced a film which had excellent transparency, hardness and scratch resistance, and adhered tenaciously to glass.

Table V reports upon solid copolymers of this material with acrylonitrile. MEK stands for methyl ethyl ketone.

Table V

| Example Number | Reagents | | | Solvent (ml.) | Conditions | | Yield (g.) | Polymer, solubility | | | |
|---|---|---|---|---|---|---|---|---|---|---|---|
| | Ether (ml.) | Nitrile (ml.) | Benzoyl peroxide (g.) | | Temp., °C. | Time (hrs.) | | Percent nitrile | MEK | Benzene | DMF |
| 49 | 0.5 | 4.5 | 0.10 | (1) 10 | 56 | 18 | 3.7 | | I | I | S. |
| 50 | 1.0 | 4.0 | 0.10 | (1) 10 | 56 | 18 | | | S | S | S. |
| 51 | 2.0 | 3.0 | 0.10 | None | 56 | 18 | 4.4 | | I | I | I. |
| 52 | 2.0 | 3.0 | 0.05 | do | 56 | 18 | 4.4 | | I | I | I. |
| 53 | 3.0 | 2.0 | 0.10 | do | 56 | 18 | 2.3 | 26.8 | S | S | S. |
| 54 | 1.0 | 4.0 | 0.10 | do | 56 | 6 | 1.5 | 45.0 | S | I | S. |
| 55 | 2.0 | 3.0 | 0.10 | do | 56 | 6 | 1.2 | 29.9 | S | | S. |
| 56 | 0.5 | 4.5 | 0.10 | (3) 10 | 56 | 23 | 4.2 | 83.8 | I | I | S. |
| 57 | 1.0 | 4.0 | 0.10 | (3) 10 | 56 | 23 | 3.5 | 76.0 | I | I | S. |
| 58 | 2.0 | 3.0 | 0.10 | (3) 10 | 56 | 23 | 0.9 | 39.7 | S | | S. |
| | | | | | | | 0.6 | 58.2 | I | I | L. |

The copolymer of Example 49 was a yellow solid which could be melted and drawn into silky fibers. Those of Examples 51 and 52 were highly cross-linked as was that of Example 58. Both Examples 53 and 58 gave soft flexible polymers. The copolymers of Examples 54 and 55 were yellowish solids which adhered exceptionally well to glass. Both Examples 56 and 57 gave white powders; that of Example 56 was transparent upon melting while that of Example 57 could be melted and drawn into flexible fibers.

EXAMPLES 59–71

The copolymers reported in Table VI were made from 2-phenyl allyl alcohol and either methylacrylate (MA) or methyl methacrylate (MMA).

Table VI

| Example Number | Alcohol (ml.) | Ester (ml.) | Solvent (ml.) | Benzoyl peroxide (g.) | Temp., °C. | Time, hrs. | Yield (g.) | Percent alcohol |
|---|---|---|---|---|---|---|---|---|
| 59 | 0.5 | MMA 4.5 | (2) 10 | 0.10 | 56 | 46 | 0.85 | 23 |
| 60 | 1.0 | MMA 4.0 | (2) 10 | 0.10 | 56 | 46 | 0.55 | 36 |
| 61 | 2.0 | MMA 3.0 | (2) 10 | 0.10 | 56 | 46 | 0.30 | 56 |
| 62 | 3.0 | MMA 2.0 | (2) 10 | 0.10 | 56 | 46 | 0.15 | 67 |
| 63 | 0.5 | MMA 4.5 | None | 0.10 | 56 | 20 | 4.7 | |
| 64 | 1.0 | MMA 4.0 | do | 0.10 | 56 | 26 | 1.8 | 27 |
| 65 | 2.0 | MMA 3.0 | do | 0.10 | 56 | 92 | 2.6 | 49 |
| 66 | 3.0 | MMA 2.0 | do | 0.10 | 56 | 92 | 1.35 | 65 |
| 67 | 0.5 | MMA 4.5 | do | 0.10 | 56 | 7 | 1.0 | 15 |
| 68 | 0.5 | MA 4.5 | do | 0.10 | 56 | 22 | 3.4 | |
| 69 | 1.0 | MA 4.0 | do | 0.10 | 56 | 27 | 1.9 | |
| 70 | 2.0 | MA 3.0 | do | 0.10 | 56 | 53 | 1.3 | |
| 71 | 3.0 | MA 2.0 | do | 0.10 | 56 | 53 | 0.8 | |

Of these solid polymers, those of Examples 59 to 62 were white powders which could be transformed to transparent films with excellent bonding properties. These copolymers, as well as Samples 64 to 67 were soluble in acetone, from which they could be precipitated by methanol. These latter copolymers formed transparent plastics that were very hard and scratch resistant. The same properties inhered in Example 63, except that only 10% of this polymer dissolved in acetone at 56° C. for 48 hours. The copolymer of Example 68 adhered tenaciously to glass upon melting and was clear and transparent. The polymer of Examples 70 and 71 dissolved in DMF and films prepared at 100° C. (375 mm. Hg) were hard and scratch resistant.

The following experiments were run in cells prepared from plates of Pyrex glass having the dimensions of 5 x 5 inches and about ¼ of an inch thick. A Teflon O ring was clamped between two pieces of this glass and a small hole was provided in the top side for filling. After the molds were filled the opening was sealed off, after the removal of air.

EXAMPLE 72

Ten grams of methyl-methacrylate containing 0.10 g. of benzoyl peroxide was charged to the glass cell. The cell was heated for 10 hours at 58° C., then 12 hours at 60° C. and finally for four hours at 100° C. The cell was cooled to about 60° C., the clamps removed and placed in cool water (about 20° C.) and the sheet of polymer separated from the glass.

EXAMPLE 73

A copolymer was prepared by charging 9.5 grams of methyl methacrylate and 0.5 gram of 2-phenyl-allyl alcohol containing 0.10 gram of benzoyl peroxide to the cell described in the previous example. The same heating schedule was also employed. A comparison of the two polymers showed a definite improvement in the hardness of the polymer containing 2-phenyl-allyl alcohol. The polymer also possessed excellent optical porperties typical of acrylate polymers.

EXAMPLE 74

A copolymer was prepared by charging 9.0 grams of methyl-methacrylate and 1.0 gram of 2-phenyl-allyl-alcohol containing 0.10 gram of benzoyl peroxide to the cell. The same heating schedule was used as described in Example 72. The polymer produced in this experiment was very hard, scratch resistant, and possessed excellent optical properties. This polymer was a considerable improvement over the polymer described in Example 72.

It is claimed:

1. A solid copolymer containing about 0.001 to 20 parts of an allyl material of the type

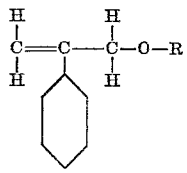

where R is selected from the group consisting of hydrogen, hydrocarbon of 1–8 carbon atoms and acyl of 1–8 carbon atoms, per part of a second material of the type

where R' is selected from the group consisting of hydrogen and hydrocarbon radicals of 1–10 carbon atoms and Y is selected from the group consisting of cyano and —COOR² where R² is alkyl of 1–6 carbon atoms, said copolymer being made by polymerization using a free radical initiator.

2. The copolymer of claim 1 characterized by an intrinsic viscosity of 0.1 to 2 in dimethyl formamide at 37.8° C.

3. The copolymer of claim 1 in which the second material is acrylonitrile.

4. The copolymer of claim 3 in which the allyl material is 2-phenyl-allyl acetate.

5. The copolymer of claim 3 in which the allyl material is 2-phenyl-allyl ethyl ether.

6. The copolymer of claim 1 in which the allyl material is 2-phenyl-allyl alcohol and the second material is methyl acrylate.

7. A polymer of 2-phenyl-allyl alcohol and acrylonitrile containing about 0.0001 to 20 parts by weight of 2-phenyl-allyl alcohol to one part of acrylonitrile, characterized by an intrinsic viscosity of about 0.1 to 2 in dimethyl formamide at 37.8° C. and being made by polymerization using a free radical initiator.

8. The polymer of claim 7 containing about 0.1 to 9 parts by weight of alcohol to one part of acrylonitrile.

9. A solid polymer of 2-phenyl-alkyl alcohol and acrylonitrile characterized by insolubility in dimethyl formamide and acetone, containing about 0.001 to 20 parts by weight of 2-phenyl-allyl alcohol to one part of acrylonitrile and being made by polymerization using a free radical initiator and curing the resulting polymer.

10. The method of claim 14 in which the initiator is benzoyl peroxide.

11. The method of claim 14 in which the polymerization temperature is about 25 to 65° C.

12. The method of claim 14 in which the polymerization mixture contains a solvent for the reactants.

13. The method of claim 12 in which the uncured polymer is also soluble in the solvent.

14. A method for making a polymer of 2-phenyl allyl alcohol and acrylonitrile characterized by insolubility in acetone and dimethyl formamide which comprises polymerizing said alcohol and said nitrile in a ratio of about 0.001 to 20 parts by weight of said alcohol to one part of said nitrile in the presence of a free-radical initiator at a temperature of about 0 to 100° C. and curing the resulting polymer by holding it in the absence of free-radical material at a temperature of about 65–130° C. for a time sufficient to bring about said insolubility characteristics.

References Cited by the Examiner
UNITED STATES PATENTS

| | | | |
|---|---|---|---|
| 2,455,722 | 12/1948 | Adelson et al. | 260—91.3 |
| 2,537,622 | 1/1951 | Butler | 260—91.3 |
| 2,624,722 | 1/1953 | Kropa et al. | 260—85.5 |
| 3,065,198 | 11/1962 | Abramo et al. | 260—85.5 |

JOSEPH L. SCHOFER, *Primary Examiner.*

LOUISE P. QUAST, DONALD E. CZAJA, *Examiners.*